United States Patent
Eckle

[15] 3,700,346
[45] Oct. 24, 1972

[54] BORING BAR INSERT
[72] Inventor: Otto Eckle, Lochgau, Germany
[73] Assignee: Firma Komet Stahlhalter-Und Werkzeugfabrik Robert Breuning GmbH, Besigheim/Neckar, Germany
[22] Filed: Feb. 1, 1971
[21] Appl. No.: 111,697

Related U.S. Application Data
[62] Division of Ser. No. 806,572, March 12, 1969, Pat. No. 3,577,810.

[30] Foreign Application Priority Data
March 20, 1968 Germany..........P 17 52 014.8
March 20, 1968 Germany..........P 17 52 012.6

[52] U.S. Cl..................................408/153, 408/185
[51] Int. Cl. .............................................B23b 29/03
[58] Field of Search.......:408/146, 153, 158, 181, 185

[56] References Cited

UNITED STATES PATENTS 2,826,943   3/1958   Townsend.................408/158

Primary Examiner—Gerald A. Dost
Attorney—Woodhams, Blanchard and Flynn

[57] ABSTRACT

A boring bar insert having two counterwise movable boring tool carriers, the tools of which are arranged at oppositely actuated ends of the boring tool carriers when rotated through 180° to one another. For counterwise movement and adjustment of the boring tool carriers there is between their mutually facing shank ends an adjusting ring co-operating with two counterwise screwthreads of the boring tool carriers and a centering device. The boring tool holders are securely held and also can be moved counterwise in the clamped condition. Centering of the boring tool carriers with respect to the boring bar axis is possible.

3 Claims, 2 Drawing Figures

PATENTED OCT 24 1972
3,700,346
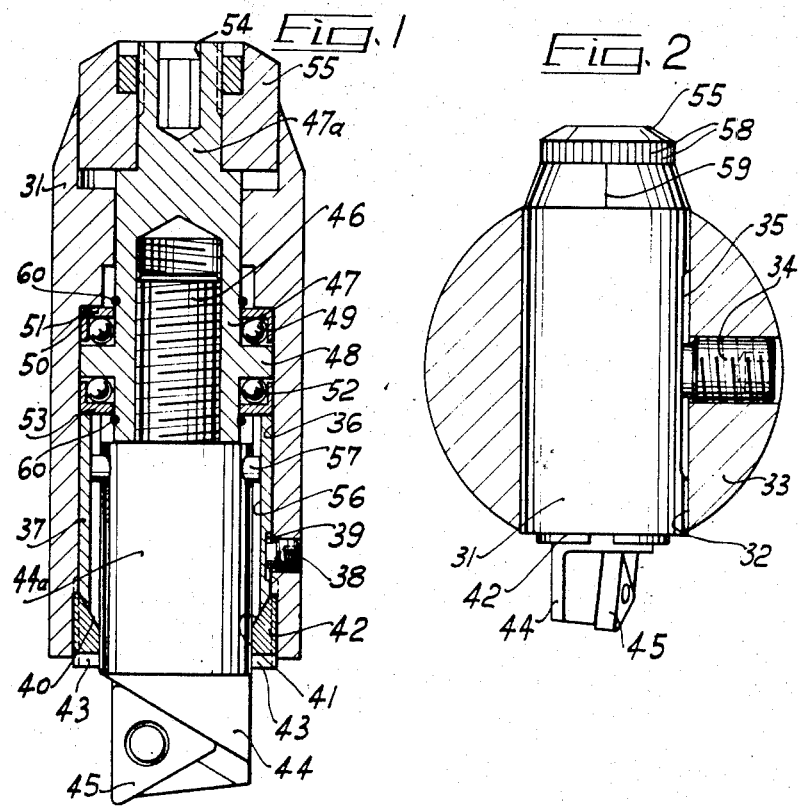
INVENTOR
OTTO ECKLE
BY
Woodhams, Blanchard & Flynn
ATTORNEYS

BORING BAR INSERT

This application is a division of my copending application Ser. No. 806,572, filed Mar. 12, 1969, now U.S. Pat. No. 3,577,810.

The invention relates to a boring bar insert, particularly one having two counterwise movable boring tool carriers, the boring tools of which, rotated through 180° to one another, are arranged at oppositely situated ends of the boring tool carriers, in which, for the counterwise movement and adjustment of the boring tool carriers, there is provided between their mutually facing shank ends, an adjusting ring co-operating with two counterwise screwthreads of the boring tool carriers, and a centering device is provided between boring bar and insert.

In one such known boring bar insert, the boring tool carriers have a square cross-section. The adjusting ring has on its periphery an annular groove with prismatic cross-section and is provided on both end faces with screwthreaded studs, the screwthreads of which run counterwise. These screwthreaded studs engage corresponding counterwise screwthreads of the shank ends. In the boring bar itself a centering screw with conical head is provided, which engages the prismatic groove of the adjusting ring. The boring bar insert may thereby be centered with respect to the boring bar axis. By rotation of the adjusting ring, the boring tool carriers are adjusted simultaneously radially counterwise outwardly or inwardly, whereby the machining diameter may be varied. By means of such a boring bar insert, equipped with two diametrically opposite boring tools, the machining time is said to be reduced to about half, without lose of accuracy or surface quality. This is based on the idea that the two boring tools, provided their cutting tips lie in a common plane of rotation, for a certain feed per revolution, always remove only one chip thickness corresponding to half the feed distance If the chip thickness, which has been found to be effective in obtaining a certain surface quality in the case of a single-acting boring tool, is retained, then in a boring tool of the present kind having two cutting edges, for constant surface quality, the feed may be doubled and hence the machining time, excluding the setting up and infeed times, may be halved.

The known boring tool insert, however, has disadvantages with regard to the mounting of the boring tool carriers and the centering of the boring tools in relation to the boring bar axis. Mounting and clamping of the boring tool carriers in the boring bar is effective exclusively by means of the centering screw engaging the prismatic groove. If the boring bar carriers do not fit the recess of the boring bar with the utmost accuracy, they can vibrate resulting in impairment of the surface quality and in shortening of the edge life of the boring tools. This occurs in particular if the work piece has different machining offsets or if, on starting to cut or on leaving the bore, there is no plans surface available. In addition, the threads of the screwthreaded studs of the adjusting ring suffer very considerably by one-sided loading of this adjusting ring. Furthermore, centering by means of the prismatic groove provided in the adjusting ring is very problematic, since it requires special measures in making the boring bar insert. As is known, each screwthread has only one start. If the two boring tool carriers are to have exactly the same distance from the prismatic groove, not only must the thread start of the screwthreaded studs provided on the adjusting ring be arranged exactly symmetrically, but the same also applies to the thread starts of the boring tool carriers. In addition, the distance from the thread start of the boring tool carrier to the cutting tip of the boring tool, even in the two boring tools, must then again be exactly the same. This requires considerable machining accuracy in making the known boring bar insert. If it is impossible to adhere to this machining accuracy the machining accuracy of the finished insert also suffers thereby.

The present invention is based on the problem of providing a boring bar insert of the aforementioned type in which, on the one hand, the boring tool carriers are securely held and also can be moved counterwise in the clamped condition, and on the other hand exact centering of the boring tool carriers with respect to the boring bar axis is possible. This is achieved according to the invention in that:

a. the boring tool carriers have a cylindrical shank and are each non-rotatably guided in a collet chuck sleeve having a cone on its outer end, b. both sleeves are guided non-rotatably guide in a throughgoing longitudinal bore of a housing insertable in the boring bar, c. screwthreaded rings are screwed in on both ends of the longitudinal bore and co-operate by their inner cone with the collet chuck sleeve, d. between each of the inner ends of the collet chuck sleeves and the adjusting ring, slidable in the longitudinal bore, there is provided an axial bearing, on which the collet chuck sleeve is supported by the effect of the axial force produced by the screwthreaded ring, and e. the centering device is provided between the housing and the boring bar.

This new boring bar insert has various advantages. Due to the screwthreaded rings, co-operating with the collet chuck sleeves and screwed in the longitudinal bore, the boring tool carriers are guided in the housing completely free from play and with adjustable clamping effect. The boring tool carriers are therefore mounted in the housing free from play and vibration. Due to the axial bearing, the boring tool carriers may be moved counterwise to-and-fro also in the clamped condition. Without slackening the screwthreaded rings, therefore, accurate adjustment of the machining diameter may be effected. The machining diameter, once adjusted, cannot alter, since after the adjustment, the screwthreaded rings, already in the clamping position, do not have to be actuated further. By means of these screwthreaded rings, however, accurate centering of the boring tool carriers with regard to the housing or the boring bar itself is also possible. For this reason, the centering device provided between housing and boring bar may be kept very simple, it may for example consist of a stud engaging a corresponding cross-groove in the housing. If, now, after fitting the boring bar insert, it is found that the boring tools are at different distances from the boring bar axis, it is possible, by slackening one clamping ring and tightening the second clamping ring, to move the boring tool carriers including the adjusting ring axially in the longitudinal bore. The possibly already adjusted machining diameter is not thereby altered in any way. After tightening one of the two screwthreaded rings, all the parts of the boring bar insert are again tightened, free from play with regard to each other both in the axial direction and in the radial direction. The advantage of altering the centering by means of the screwthreaded rings also makes it possible to use so-called turn-round plates. As boring tools on the boring tool carriers. Even if these turn-round plates have different dimensions through repeated grinding, the boring tool carriers, including the turn-round plates may be recentered, so that the cutting tips of the turn-round plates have the same distance from the boring bar axis.

If the adjusting ring is provided with an adjusting scale, in which case the housing must be provided with a central opening, so that the adjusting scale will be visible and the adjusting ring accessible, exact adjustment of the machining diameter may be made with an accuracy of some thousandths of a millimeter not only in the dismounted state of the boring bar insert, but also when the insert is in the boring bar.

Further advantages and details of the invention are described more particularly in the following with references to embodiment examples shown in the accompanying drawings, in which FIG. 1 shows an axial section through the boring bar insert: and FIG. 3 shows a cross-section through this embodiment.

Referring to FIGS. 1 and 2 at 31 is shown a housing insertable in a recess 32 of the boring bar 33. This housing may have a cylindrical or also a rectangular cross-section according to whether the boring bar 33 has a recess with a round or rectangular cross-section. By means of a set screw 34, acting on a flat 35 of the housing, the boring bar insert is held fast against axial movement and is secured against rotation.

The housing 31 has a longitudinal bore 36. In this longitudinal bore, a collet chuck sleeve 37 is axially slidable but non-rotatable. Non-rotatability is effected by means of the screw 38 engaging a longitudinal groove 39 of the collet chuck sleeve. The collet chuck sleeve, at its front end, has a cone 40 and in its front region is provided with a number of longitudinal slits, not shown in the drawing, so that it can be radially deformed. The inner cone 41 of the screwthreaded ring 42, screwed into the front end of the longitudinal bore, co-operates with the cone 40. The screwthreaded ring has two recesses 43 for its actuation. Mounted inside the collet chuck sleeve is the boring tool carrier 44, carrying the boring tool 45 on its front end. A screwthreaded stud 46 is provided on the rear end of the boring tool carrier. Co-operating with this screwthreaded stud 46 is the adjusting nut 47, which has a collar 48. The nut is supported rearwardly on a shoulder 51 of the longitudinal bore 36 by means of an axial ball bearing 49 and a bearing ring 50. Another axial ball bearing 52 is provided between the rear end of the collet chuck sleeve 37 and the collar 48, a bearing ring 53 again being interposed here.

The adjusting nut 47 has a rearwardly prolonged shank 47a, provided with an internal hexagon 54 for insertion of a corresponding spanner. The indexing sleeve 55 is mounted on the shank 47a, and carries a scale 58 on its periphery. The scale co-operates with a zero mark 59 on the housing 31. It is thereby possible to read off exactly the adjustment of the boring tool carrier.

The boring tool carrier itself is slidably guided in the collet chuck sleeve 37, but is secured against rotation. For this purpose, the collet chuck sleeve has internally two or even more longitudinal grooves 56 engaged by pins 57 let into the shank 44a of the boring tool carrier.

Preferably, the bearing rings 50 and 53 are so constructed that they embrace the balls 49 and 52 from the outside. Spring rings 60 secure the bearing rings on the nut 47 against axial displacement, so that the balls 49 and 52 cannot fall out when the parts are being removed or fitted.

The mode of operation is as follows:

After assembly of the boring bar insert, the screwthreaded ring 42 is tightened until all play in the axial and radial directions is eliminated. In the radial direction, through co-operation of the inner cone 41 of the screwthreaded ring 42 and cone 40 of the collet chuck sleeve, the latter bears against the shank 44a of the boring steel carrier. Radial play is thus eliminated. At the same time, however, the screwthreaded ring 42 also exerts an axial force on the collet chuck sleeve 37. Since the collet chuck sleeve is axially slidable, the total axial play between the bearings 49 and 52 and the collar 48 of the adjusting nut 47 and the shoulder 51 is eliminated. The nut is thus held free from play in the axial direction. Despite the fact that here also there is a certain preliminary stressing, the nut can be comparatively easily rotated for adjusting purposes. If a corresponding spanner is inserted in the internal hexagon 54, the boring tool carrier 44 can be moved both forward and backward by rotation of the nut. It is self-evident that in this case for eliminating any play still present in the screwthreads between nut 47 and the screwthreaded stud 46, adjustment should always be carried out so that the boring tool carrier is displaced always in the same direction.

The embodiments of the invention in which an exclusive property or privilege is claimed are defined as follows:

1. Boring bar insert having a housing insertable into a recess of the boring bar, which housing has a boring tool carrier which is supported movably in a longitudinal bore in said housing and has at the front end thereof the boring tool and at the rear end thereof a screw threaded stud, an adjusting nut cooperating with said screw threaded stud and being nonmovably supported in the rear portion of the longitudinal bore and a clamping device between said housing and said boring tool carrier, the improvement comprising wherein:
   a. the nut has a collar which is supported rearwardly on a shoulder of the longitudinal bore by a first axial bearing,
   b. the boring tool carrier is guided nonrotatably on its shank in a cylindrical collet chuck sleeve which has a cone at its front end,
   c. the collet chuck sleeve is secured against rotation and is arranged movably in the longitudinal bore,
   d. a screw threaded ring having an internal cone is screwed in at the front end of the longitudinal bore, which screw threaded ring cooperates with its internal cone with the cone of the collet chuck sleeve, and e. a second axial bearing is provided between the rear end of the collet chuck sleeve and the collar of the nut on which axial bearing the collet chuck sleeve is supported under the effect of the axial force caused by the screw threaded ring.

2. Boring bar insert according to claim 1, wherein the axial bearings are constructed as antifriction bearings, and a bearing ring is provided respectively between the rear end of the collet chuck sleeve and the antifriction elements, and between the shoulder and the antifriction elements.

3. Boring bar insert according to claim 2, wherein each bearing ring partly embraces the antifriction elements from the outside and is secured to the nut by a spring ring preventing axial displacement.

* * * * *